US005201181A

United States Patent [19]

Ohmori et al.

[11] Patent Number: 5,201,181

[45] Date of Patent: Apr. 13, 1993

[54] COMBUSTOR AND METHOD OF OPERATING SAME

[75] Inventors: Takashi Ohmori; Yoji Ishibashi; Hiroshi Inoue, all of Hitachi; Fumio Kato, Ibaraki; Takashi Hashimoto, Ushiku; Shigeyuki Akatsu, Hitachi; Michio Kuroda, Hitachi; Seiichi Kirikami, Hitachi, all of Japan

[73] Assignee: Hitachi, Ltd., Tokyo, Japan

[21] Appl. No.: 523,347

[22] Filed: May 14, 1990

[30] Foreign Application Priority Data

May 24, 1989 [JP] Japan .................................. 1-128851

[51] Int. Cl.[5] .................................................. F02C 1/02

[52] U.S. Cl. ...................................... 60/737; 60/39.03; 60/747

[58] Field of Search .................. 60/737, 738, 746, 747, 60/732, 733, 39.03, 39.07

[56] References Cited

U.S. PATENT DOCUMENTS

| | | | |
|---|---|---|---|
| 4,249,373 | 2/1981 | Sotheran et al. | 60/738 |
| 4,603,548 | 8/1986 | Ishibashi et al. | 60/746 |
| 4,735,052 | 4/1988 | Maeda et al. | 60/733 |

FOREIGN PATENT DOCUMENTS

| | | | |
|---|---|---|---|
| 169431 | 1/1986 | European Pat. Off. . | |
| 269824 | 6/1988 | European Pat. Off. . | |
| 281961 | 9/1988 | European Pat. Off. . | |
| 60-49136 | 11/1986 | Japan | 60/747 |
| 2013788 | 8/1979 | United Kingdom . | |
| 2072827 | 10/1981 | United Kingdom . | |
| 2146425 | 4/1985 | United Kingdom . | |

*Primary Examiner*—Richard A. Bertsch
*Assistant Examiner*—Charles G. Freay
*Attorney, Agent, or Firm*—Antonelli, Terry, Stout & Kraus

[57] ABSTRACT

A combustor includes a first premixture supply device provided in a central portion of a combustion chamber disposed generally concentric with a combustion cylinder, and a second premixture supply means provided adjacent to an outer periphery of the first premixture supply device. The first premixture supply device is operable when the combustor is under a high load, and the second premixture supply device is operable when the combustor is under a low load. A method of operating a combustor is also proposed wherein the combustor comprises a combustion cylinder having a combustion chamber therein and a premixture supply device provided on one side of the combustion cylinder for supplying a combustible mixture to the combustion chamber. The premixture supply device comprising at least two inner and outer premixture supply devices. The outer premixture supply device is operable in a low-load range of the combustor while the inner and outer premixture supply devices are operable in a high-load range of the combustor at above a predetermined load. The first and second premixture supply devices include first and second burners, respectively. The first and second burners are operated in such a manner that the ratio of the load borne by the first burner to the load borne by the second burner is 1:1 in the high-load range.

9 Claims, 6 Drawing Sheets

COMBUSTOR AND METHOD OF OPERATING SAME

BACKGROUND OF THE INVENTION

This invention relates to a combustor for a gas turbine and more particularly, to a combustor of the premix combustion-type and a method of operating such a combustor.

Most of conventional combustors of the general type employ a two-stage combustion system to reduce production of NOx. More specifically, in such a combustor, a diffusion combustion is effected at one end of a combustion cylinder, at the head of the combustor, for the purpose of stabilizing a flame whereas, a premix combustion, highly effective in reducing NOx, is effected downstream of the one end of the combustion cylinder.

Such a combustor is disclosed, for example, in U.S. Pat. No. 4,292,801. More specifically, this conventional combustor comprises a first-stage diffusion combustion burner mounted on a head of the combustor, and a second-stage diffusion combustion burner extending from the combustor head toward a central portion of a combustion chamber. The diameter of the combustion chamber is reduced or constricted in the vicinity of an outlet of the second-stage burner. At the start of combustion, fuel is supplied to the first-stage burner and is ignited so as to effect a diffusion combustion in a first-stage combustion chamber. Then, as the combustion load increases, fuel is introduced into the second-stage burner so as to effect a diffusion combustion in a second-stage combustion chamber. Then, simultaneously when the first-stage fuel is transferred to the second-stage burner, the first-stage burner is extinguished (turned off), and then fuel is again charged into the first-stage burner. At this time, the first-stage combustion chamber serves as a premix chamber for mixing the fuel and the air together. Therefore, at the time of a high-load combustion, a fuel-air premixture from the first-stage combustion chamber is burned by the heat source of the second-stage burner so as to continue the combustion.

In the combustor of such a construction, premix combustion is carried out mainly when the combustor is operated under a load higher than a predetermined level, and therefore this combustor is very effective in reducing NOx. This type of combustor is satisfactory in that during a high-load operation, it discharges small amounts of NOx and uncombusted substances such as CO, which means that the combustion is sufficiently effected in the combustion chamber, and therefore very little of the combustible fuel-air mixture is discharged in an uncombusted condition from the combustor. However, during a low-load operation of the combustor, that is, under a condition in which the fuel-air mixture is lean, the cooling air enters about the wall surface of the combustion chamber, so that the amount of discharge of unburned substances such as CO tends to increase.

SUMMARY OF THE INVENTION

It is an object of this invention to solve the above problems of the prior art.

Another object of the invention is to provide a combustor which will not discharge CO and other substances even under a low-load operation of the combustor, that is, when a combustible fuel-air mixture is lean.

To the above-described end, the present invention provides a combustor comprising premixture supply means which comprises first premixture supply means disposed about a central portion of a combustion chamber generally coaxial with a combustion cylinder and operable when the combustor is under a high load, and second premixture supply means provided adjacent to an outer periphery of the first premixture supply means and operable when the combustor is under a low load.

In one aspect, the present invention provides a method of operating a combustor comprising a combustion cylinder having a combustion chamber therein, and premixture supply means provided at one end of the combustion cylinder to supply a combustible mixture to the combustion chamber, with the premixture supply means including at least two inner and outer premixture supply means, and with the outer premixture supply means being operable in a low-load range of the combustor whereas, the inner and outer premixture supply means are operable in a high-load range of the combustor at above a predetermined load, the first and second premixture supply means including first and second burners respectively. The method includes operating the first ann second burner in such a manner that a ratio of the load borne by the first burner to the load borne by the second burner is 1:1 in the high load range.

With such arrangement of the invention, the burner of the second premixture supply means, that is, the burner disposed near the outer periphery of the combustion chamber is operated to enable a maintaining of the temperature of combustion gas high at the outer periphery of the combustion chamber even in a low load condition of the combustor, so that in a low load condition of the combustor, production of uncombusted substances such as CO tending to be produced at the outer periphery of the combustion chamber can be prevented.

BRIEF DESCRIPTION CF THE DRAWINGS

DESCRIPTION OF THE PREFERRED EMBODIMENTS OF THE INVENTION

Figure 1:
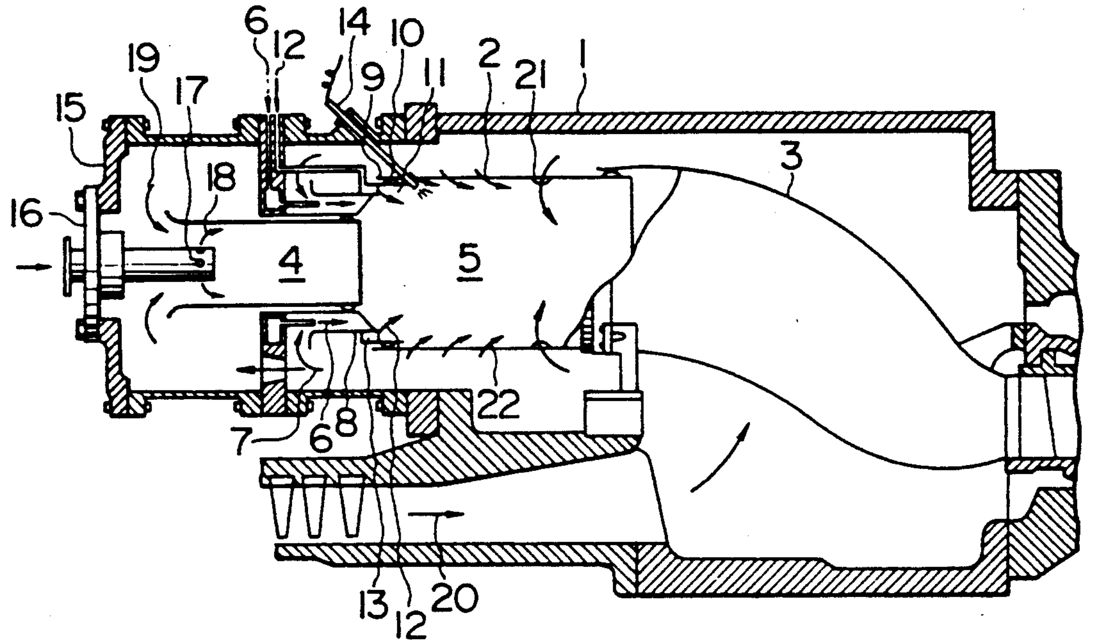
FIG. 1 is a vertical cross-sectional view of a combustor in accordance with the present invention.
Figure 2:
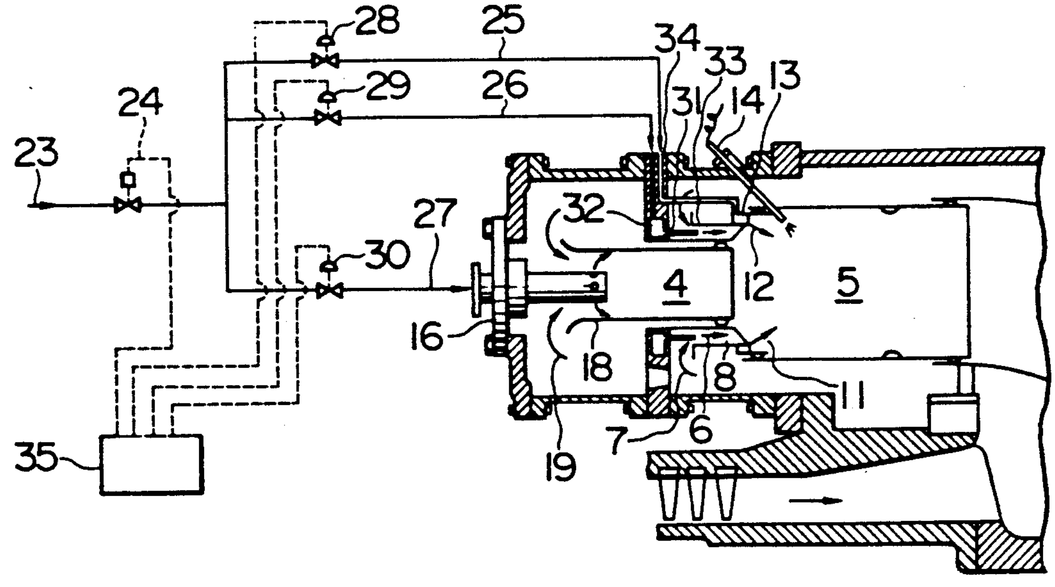
FIG. 2 is a cross-sectional view of an essential portion of the combustor of FIG. 1, showing a fuel supply system.

As shown in FIG. 1 a combustor of the present invention comprises an outer cylinder 1, an inner cylinder (or combustion cylinder) 2 mounted within the outer cylinder 1, a tail cylinder 3 mounted within the outer cylinder 1 and connected at one end to the inner cylinder 2 and directed at the outer end toward a turbine, a premix chamber 4 provided at a head of the inner cylinder 2, a combustion chamber 5 for receiving a combustible fuel-air mixture, a premixture supply means provided at one side of the combustion chamber 5, an auxiliary burner 13 provided in the vicinity of the premixture supply means to be supplied with auxiliary fuel 12 and air, and an ignition plug 14 provided downstream of the auxiliary burner 13 to ignite the auxiliary burner 13. The premixture supply means comprises a first (inner) premixture supply means operable during a high-load operation of the combustor, and a second (outer) premixture supply means operable during a low-load operation of the combustor. The first premixture supply means includes a fuel nozzle 16 fixedly mounted on an end plate 15 fixedly mounted to one end of the outer cylinder 1 opposite to the turbine to supply fuel for a first premixture to the premix chamber 4. Fuel 18 is supplied to the premix chamber 4 from the fuel nozzle 16 and air 19 is supplied to the premix chamber 4 through a space between the fuel nozzle 16 and the inner peripheral surface of the inner cylinder 2. Therefore, the first premixture is formed by the fuel 18 and the air 19 within the premix chamber 4, and this combustible fuel-air mixture is supplied to the combustion chamber 5. The second premixture supply means includes a premix burner 8 provided adjacent to the outer periphery of the premix chamber 4, that is, adjacent to the inner peripheral surface of the inner cylinder 2. The premix burner 8 is supplied with fuel 6 and air 7 so as to supply a second fuel-air premixture to the combustion chamber 5. As shown in FIG. 2, the premix burner 8 includes a fuel chamber 32 provided in a flange 31 fixedly mounted on the outer cylinder 1, an annular flow passage 33, and fuel nozzles 34 projecting into the annular flow passage 33. The auxiliary burner 13 is disposed around the outer periphery of the premix burner 8 in the vicinity of an injection port of the premix burner 8, and is disposed adjacent to an abruptly-expanded portion 9 of the combustion chamber 5. Arrow 20 denotes the flow of air supplied from a compressor (not shown) to the combustor.

As shown in FIG. 2, a fuel supply system comprises a fuel pressure control valve 24 for controlling the flow rate of fuel 23 fed from a fuel source (not shown), three fuel supply pipes 25, 26 and 27 provided downstream of the control valve 24 in a branched manner to pass the auxiliary fuel 12, the first premixture fuel 18 and the second premixture fuel 6 therethrough, respectively, three fuel flow rate control valves 28, 29 and 30 mounted respectively on the three fuel supply pipes 25, 26 and 27 to control the flow rates of the respective fuels through these three fuel supply pipes, respectively, and a control 35 for producing control signals in accordance with the load level of the turbine to control the above valves 24, 28, 29 and 30.

The operation of the above combustor as well as a method of operating the combustor will now be described with reference to FIGS. 1 and 2.

The fuel 23 from the fuel source, after passing past the fuel pressure control valve 24, is divided into the auxiliary fuel 12, the first premixture fuel 18 and the second premixture fuel 6. These fuels are supplied to the auxiliary burner 13 and the first and second premixture supply means, respectively, via the respective fuel flow rate control valves 28, 29 and 30 and the respective fuel supply pipes 25, 26 and 27. The auxiliary fuel 12 and the second premixture fuel 6 pass through the flange 31, and the auxiliary fuel 12 is supplied to the auxiliary burner 13 disposed adjacent to the abruptly-expanded portion 9 of the combustion chamber 5, while the second premixture fuel 6 reaches the fuel nozzles 34 via the fuel chamber 32 and is injected into the premix burner 8 from injection ports provided respectively at distal ends of these nozzles. The first premixture fuel 18 is supplied to the fuel nozzle 16 via the flow rate control valve 30. These fuels are not always supplied, but are supplied in the following manner. At the start of combustion, the ignition plug 14 is operated, and at the same time the flow control valve 28 is operated to allow the auxiliary fuel 12 to inject from the auxiliary burner 13 to form a flame at a recess portion 11. Then, the flow rate control valve 29 is operated to flow a predetermined amount of the second premixture fuel 6 to form the second premixture, that is, a combustible fuel-air mixture, and this premixture is injected from the premix burner 8. This combustible mixture is combusted by a heat source of the flame formed by the auxiliary burner 13. Further, at the time of a high-load combustion, the flow control valve 30 is operated to feed the first premixture fuel 18 via the fuel nozzle 16 to the premix chamber 4 provided at the head of the combustor, thereby forming the first premixture, that is, a combustible fuel-air mixture, and this combustible mixture is supplied to the combustion chamber 5. These operation controls are automatically carried out by the signals from the control 35 in accordance with the load level of the turbine.

Figure 3:
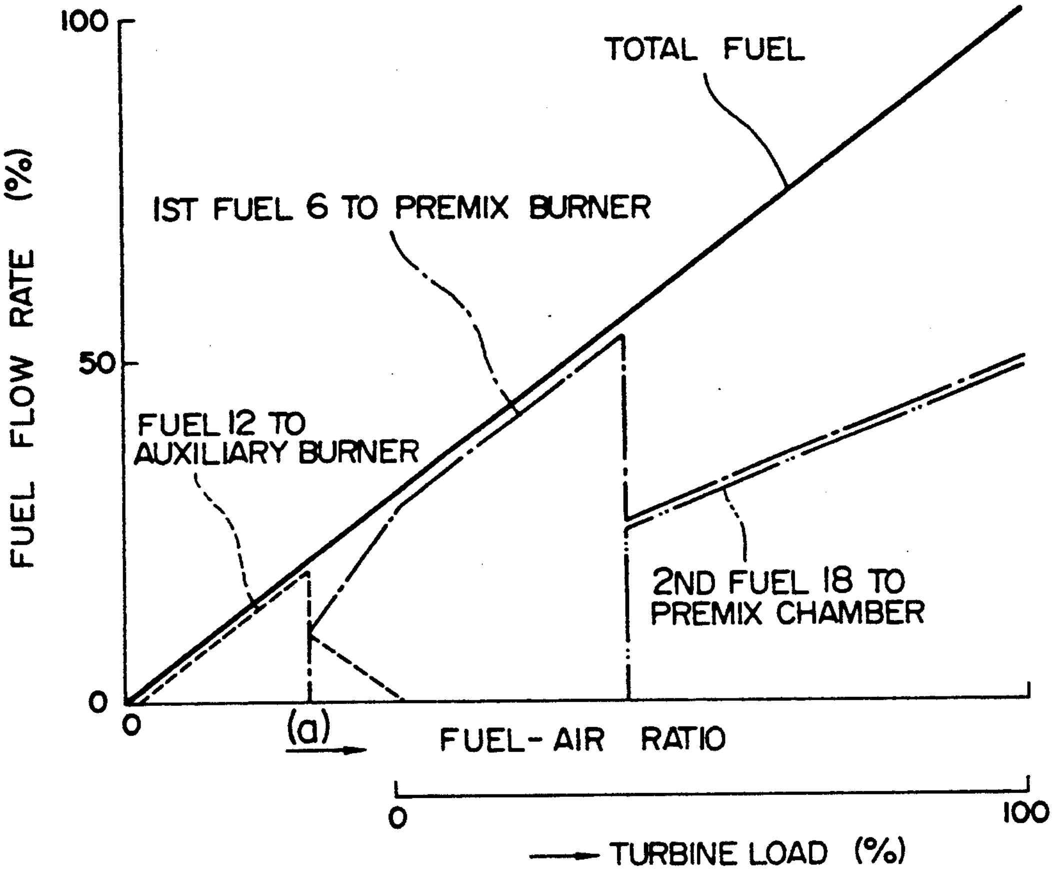
FIG. 3 is a graphical illustration of the relationship of fuel flow rates and operating burners with respect to a turbine load.
Figure 4:
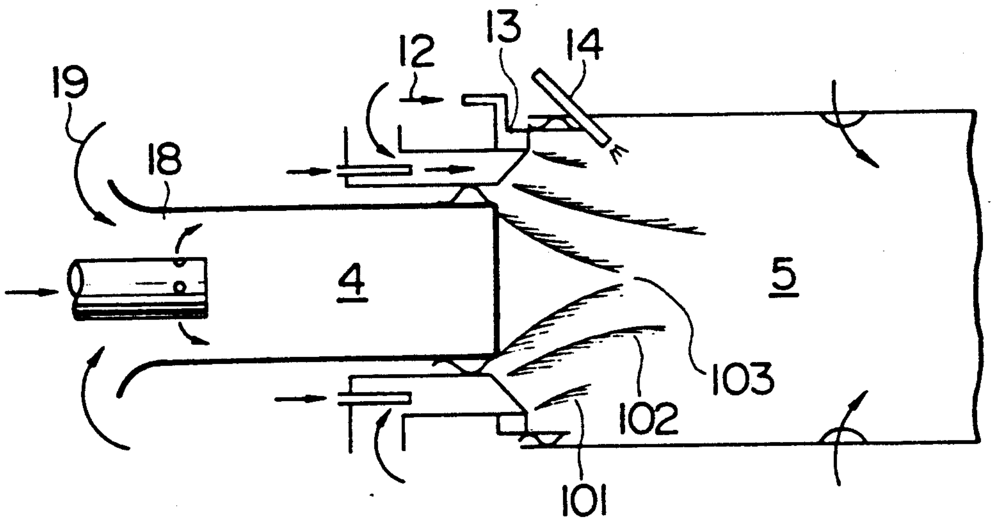
FIG. 4 is a schematic view of the combustor, showing patterns of flames formed by burners.

FIG. 3 shows the flow rate of the fuel 12 for the auxiliary burner 13, the flow rate of the second premixture fuel 6 for the premix burner 8 and the flow rate of the first premixture fuel 18 for the premix chamber 4 with respect to the turbine load. In FIG. 3, a solid line represents the flow rate of the total fuel introduced into the combustion chamber 5 in accordance with the turbine load, a chain line represents the flow rate of the auxiliary fuel 12 fed to the auxiliary burner 13, and a one-dot chain line represents the flow rate of the second premixture fuel 6 fed to the premix burner 8, and a two-dot chain line represents the flow rate of the first premixture fuel 18 fed to the premix chamber 4. As is clear from FIG. 3, the flow rate of the auxiliary fuel 12 increases from the start of combustion, and decreases in a stepwise manner about a point a of the turbine no-load, without changing the load level, and then gradually decreases to the turbine no-load. The second premixture fuel 6 is supplied to the premix burner 8 at the point a of the turbine no-load, and its flow rate increases, and then decreases in a stepwise manner at 25% of the full turbine load, and then increases at a rate half of the flow rate of the total fuel in accordance with the turbine load. The first premixture fuel 18 is supplied in a stepwise manner to the premix chamber 4 provided at the head of the inner cylinder 2 at 25% of the full turbine load, and its flow rate increases at a rate half of the flow rate of the total fuel in accordance with the turbine load. Therefore, the flow rate of the first premixture fuel, as well as the flow rate of second premixture fuel, amounts to 25% to 50% of the total fuel in the range of 25% to 100% of the full turbine load. Patterns of flames formed in the combustion chamber 5 by the above fuel control are shown in FIG. 4. At the start of combustion, the auxiliary burner 13 is operated for a time period from the ignition of the auxiliary fuel 12 to the turbine no-load to form a flame 101 in the combustion chamber 5. The premix burner 8 forms a premix flame 102 in the combustion chamber 5 in the range from around the point a of the turbine no-load to 100% of the full turbine load, and solely effects combustion in the range from the turbine no-load to 25% of the full turbine load. The premixture fuel 18, supplied to the premix chamber 4 at the head of the inner cylinder 2, forms a combustion flame 103 in the range of 25% to 100% of the full turbine load. Namely, each of the first and second premixture fuels is supplied at a rate of 50% of the total fuel in the rated range in accordance with the turbine load.

The fuel control operation method may be carried out in the following manner. In order to achieve a great reduction of NOx by the premix combustion, fuel is supplied to the auxiliary burner throughout the entire turbine load to enhance flame stabilization at the outer periphery side of the combustion chamber, and, at the same time, the combustible mixtures from the premix burner and the premix chamber are combusted in a more lean condition, thereby reducing NOx. Further, in the case where a fuel-air ratio control function is applied to the premix burner, the combustible mixtures from the premix burner and the premix chamber can be combusted in a more lean condition, using the flame of the auxiliary burner as a basis. Particularly where the premix burner is subjected to a fuel-air ratio control, the transfer of flame from the auxiliary burner, as well as a combustion pattern of the combustible mixture fed from the premix chamber, can be freely determined, thereby achieving a stable premix combustion and a very advantageous operation control. In the above examples, the auxiliary burner is used, and although this auxiliary burner is advantageous in achieving a smooth start of combustion and the stabilization of flame, the auxiliary burner is not always essential. For example, similar effects can be achieved by providing an ignition plug on the premix burner disposed at the outer periphery side of the combustion chamber and by effecting a fuel-air ratio control so as to operate this premix burner for a period of time from the start of the combustion to a low-load state.

Figure 5:
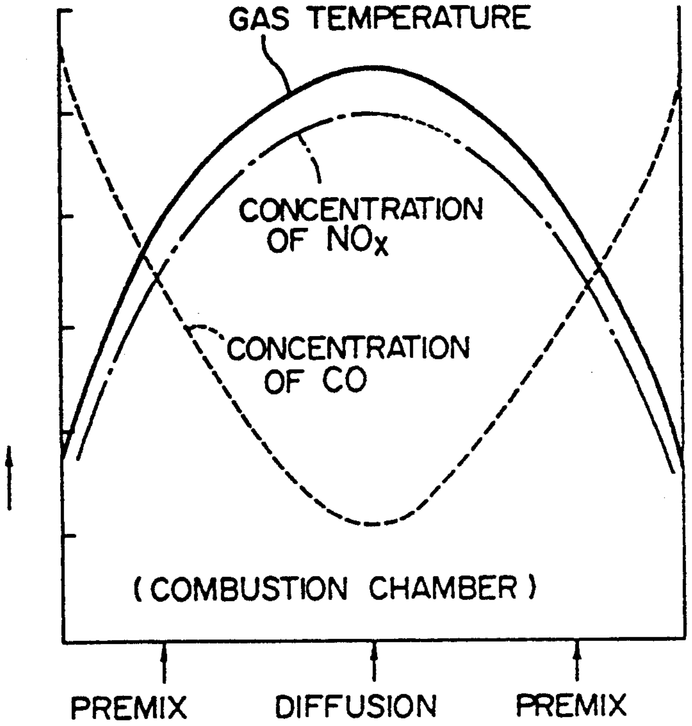
FIG. 5 PRIOR ART
FIG. 5 is a graphical illustration of gas temperature and NOx concentration and CO concentration in a conventional combustor.
Figure 6:
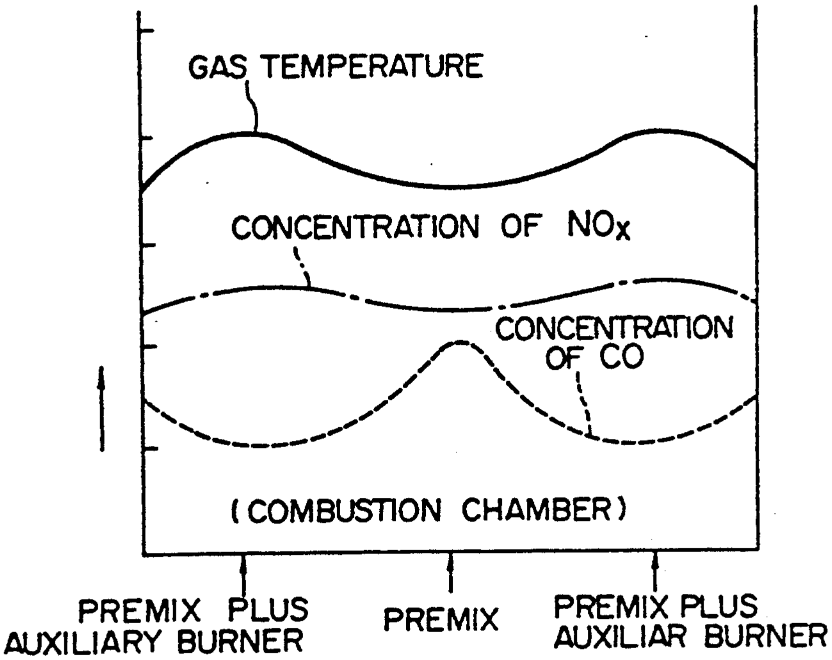
FIG. 6 is a graphical illustration of gas temperature and NOx concentration and CO concentration in the combustor of the present invention.

FIG. 5 shows the condition of the upstream side of the combustion chamber during the diffusion-premix combustion. The gas temperature is high at the radially-central portion of the combustion chamber, and a low temperature region is formed at the outer peripheral portion of the combustion chamber. Therefore, the premix mixture flowing at the outer peripheral portion of the combustion chamber is not satisfactorily combusted, thereby producing uncombusted substances such as CO. Particularly, since a cooling air layer is present about the wall surface of the combustion chamber, it is considerably difficult to remove such uncombusted substances once they are produced. Further, the high temperature region at the radially-central portion of the combustion chamber constitutes a source of production of NOx, thus failing to achieve a great reduction of NOx. On the other hand, according to the present invention, the first and second premixture supply means are provided inside and outside the combustion chamber, respectively. The outside second premixture supply means is operated during the low-load operation of the turbine, thus providing a complete premix construction and, as shown in FIG. 6, the gas temperature is relatively averaged to thereby reduce NOx and CO at the same time. In other words, in the present invention, since the flow or movement of air, etc., on the outer peripheral portion of the combustion chamber at its upstream side portion is relatively small, the flame from the auxiliary burner can be relatively easily formed, and also an excessive cooling at the outside of the combustion chamber is prevented during the low-load operation of the turbine, thereby adequately preventing the production of uncombusted substances. Further, for increasing the combustion in accordance with the turbine load, since the surrounding heat sources (contact ratio, etc.) are large, the thermal diffusion movement (flame propagation and combustibility) at the downstream side of the combustion chamber is rapid. This enables suppressing the production of uncombusted substances at those portions of the combustion chamber where the mixture is more lean and also at the outlet side of the combustion chamber. Therefore, the present invention provides an improved combustor which can suppress the production of NOx and CO over a range from the turbine no-load to the rated load.

Figure 7:
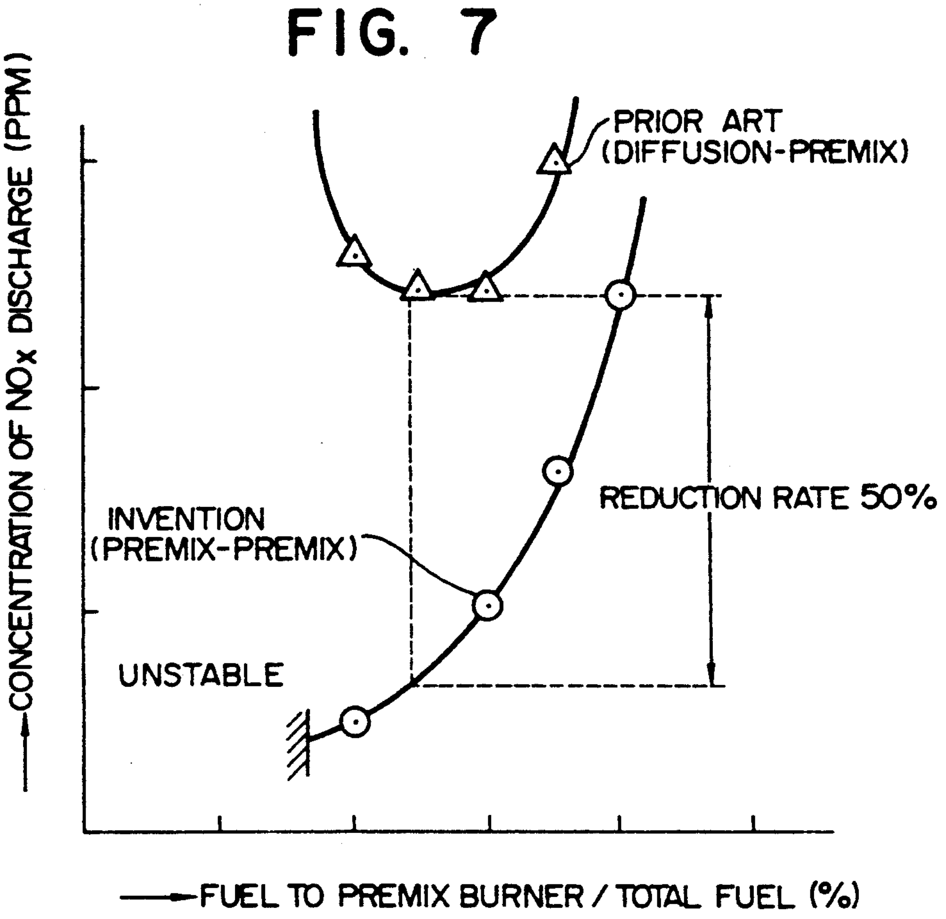
FIG. 7 is a graphical illustration of the relationship between the fuel ratio and the NOx exhaust concentration in the present invention and the prior art.
Figure 8:
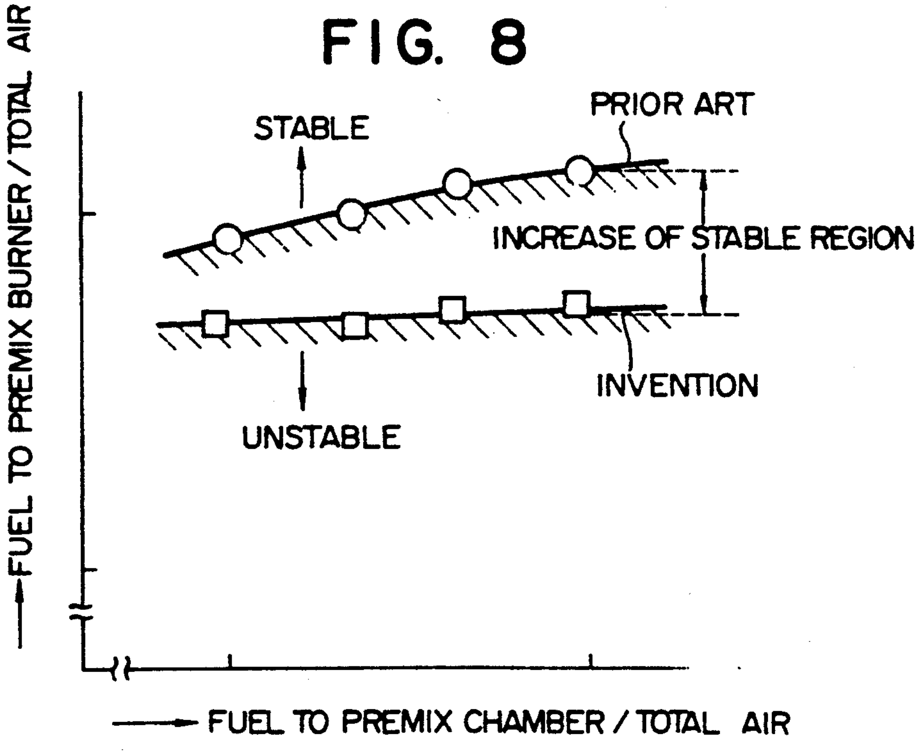
FIG. 8 is a graphical illustration of the stability with respect to the fuel-air ratio.

FIG. 7 shows a comparison in NOx characteristics in combustion between the prior art and the present invention. Even in the prior art, a region of low production of NOx exists in a certain range where the ratio of premix combustion amount to the diffusion combustion amount has a specified value. In the complete premix combustion according to the present invention, an amount of NOx can be reduced to less than ½ of that achieved by the prior art. Further, as shown in FIG. 8, in the combustor of the present invention, even when the fuel-air ratio is shifted 30% toward the lean side with respect to the prior art, there can be achieved a stable combustion free from the production of CO and other substances.

Figure 9:
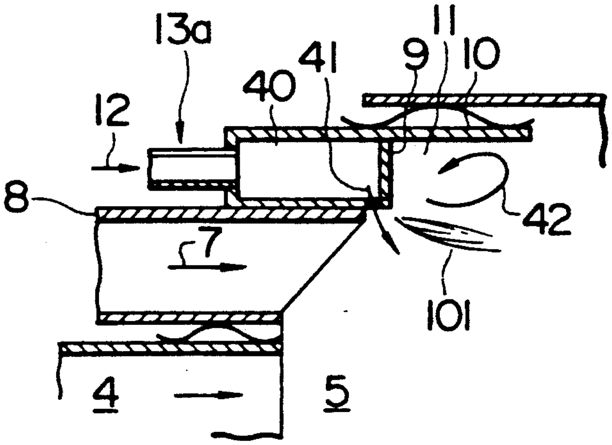
FIGS. 9 to 14 are fragmentary, vertical cross-sectional views, showing modified auxiliary burners of the invention.
Figure 10:
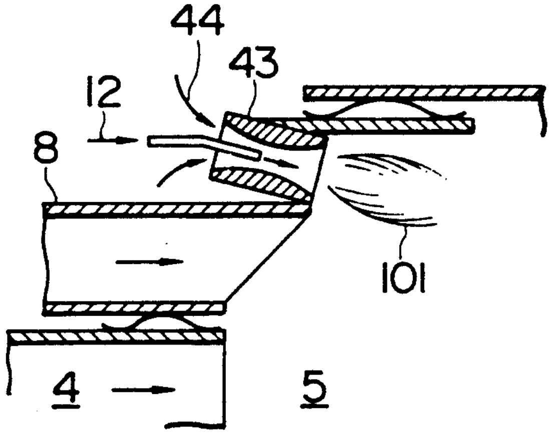
Figure 11:
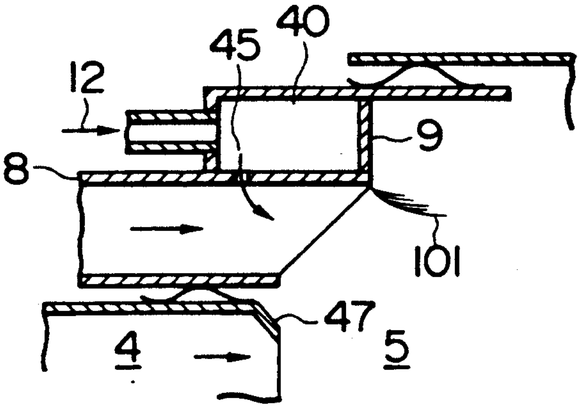
Figure 12:
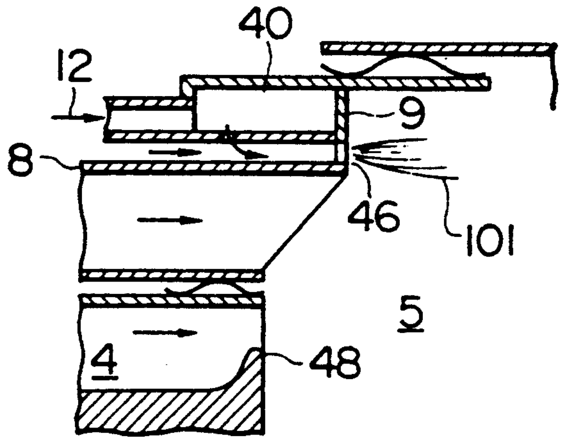
Figure 13:
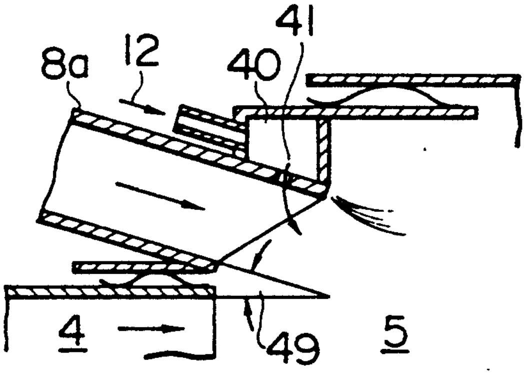
Figure 14:
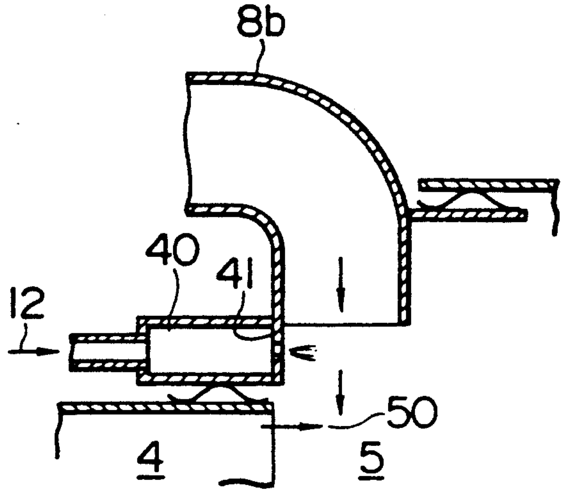

In an auxiliary burner 13*a* shown in FIG. 9, a plurality of holes or slits 41 are formed through an inner wall of a fuel tank 40 adjacent to a distal end thereof, with the fuel tank 40 receiving the auxiliary fuel 12. A recess portion 11 is provided immediately adjacent to the distal end of the fuel tank 40, and is defined by an abruptly-expanded portion 9 and an annular portion 10. When the auxiliary burner 13*a* is to be ignited, the auxiliary fuel 12 is injected through the holes 41 toward the air 7 fed from the premix burner 8, and this fuel-air mixture is ignited by an ignition plug to form a flame 101. This flame 101 is kept stable by vortexes 42 induced in the recess portion 11 by a jet of the air 7. FIG. 11 shows a modification in which holes 45 are formed through a wall of the premix burner 8 adjacent to a proximal end of a fuel tank 40, so that the auxiliary fuel 12 can be injected into the premix burner 8. In FIG. 12 which holes 46 are formed through the abruptly-expanded portion 9 of the recess portion 11. As shown in FIGS. 11 and 12, a constricted portion 47 or 48 is formed at the outlet of the premix chamber 4 provided at the upstream side of the combustion chamber 5 at its radially-central portion. With this construction, the velocity of flow of the combustible fuel-air mixture is increased, thereby effectively preventing the flame from being directed reversely. In FIG. 10 a premix-and-auxiliary burner 43 mixes air 44 and the fuel 12 together so as to form a flame 101 in the combustion chamber 5. In order to effectively transfer the flame of the premix burner 8 to the combustible fuel-air mixture fed from the premix chamber 4, the premix burner 8*a* may be inclined at an angle 49 relative to the premix chamber 4 as shown in FIG. 13, or the premix burner 8*b* may be disposed perpendicular to the premix chamber 4 as indicated by reference numeral 50 in FIG. 14. With this arrangement, the combustible fuel-air mixture from the premix chamber 4 can be effectively combusted.

As described above, in the present invention, the premix burner provided at one end (head side) of the combustion cylinder is disposed generally concentric with the combustion cylinder. The first premix burner is operable in a high-load range of the combustor. The second premix burner is provided adjacent to the outer periphery of the first premix burner, and is operable at least a low-load range of the combustor. With this construction, even when the combustor is under a low load, an uncombusted substance (i.e., CO), which would tend to develop adjacent to the inner peripheral surface of the combustion cylinder, that is, at the outer peripheral portion of the combustion chamber, can be sufficiently prevented from being produced.

Further, as the load increases, the combustible fuel-air mixture is supplied to the combustion chamber from the upstream side of the combustion chamber at its radially-central portion, and therefore the surrounding heat source is large when the combustible mixture is burned, so that the thermal diffusion movement is rapid at the downstream side, thereby effectively suppressing the development of the unburned substance at the outlet of the combustion chamber.

Although the present invention has been specifically described with reference to the above embodiments, the invention itself is not to be restricted to such embodiments, and various modifications can be made without departing from the scope of appended claims.

What is claimed is:

1. A combustor including a combustion cylinder having a combustion chamber and premixture supply means provided on one side of said combustion chamber to supply a combustible mixture to said combustion chamber, said combustion chamber exhausting a combustion gas from the other end of said combustion chamber, p1 wherein, said premixture supply means comprises outer premixture supply means located near an inner wall surface of said combustion cylinder and operable when said combustor is operating at a low load, and inner premixture supply means located inwardly with respect to said outer premixture supply means and near an axis of said combustion cylinder and operable when said combustor is operating at a high load; and an auxiliary burner operable at the start of the operation of said combustor and having an ignition plug provided near said outer premixture supply means.

2. A combustor including a combustion cylinder having a combustion chamber and premixture supply means provided on one side of said combustion chamber so as to supply a combustible mixture to said combustion chamber to generate a premix combustion, wherein said premixture supply means comprises first premixture supply means disposed in a central portion of said combustion chamber disposed generally concentric with said combustion cylinder and operable when said combustor is operated at a high load, and second premixture supply means provided adjacent to an outer periphery of said first premixture supply means and operable when said combustor is operated at a low load and wherein said combustor further includes a auxiliary burner operable at the start of the operation of said combustor.

3. A combustor including as combustion cylinder having a combustion chamber and premixture supply means provided on one side of said combustion cylinder to supply a combustible mixture to said combustion chamber to generate a premix combustion, wherein said premixture supply means includes first premixture supply means disposed along an axis of said combustion cylinder and operable when said combustor is operated at a high load, and second premixture supply means provided adjacent to an outer periphery of said first premixture supply means and operated during an entire load range of said combustor and wherein said combustor further includes a auxiliary burner operable at the start of the operation of said combustor.

4. A combustor comprising a combustion cylinder having a combustion chamber and premixture supply means provided on one side of said combustion cylinder to supply a combustible mixture to said combustion chamber, wherein said premixture supply means includes first premixture supply means disposed along an axis of said combustion cylinder and operating at a high-load range of said combustor, and second premixture supply means provided adjacent to an outer periphery of said first premixture supply means and operating in at least a low-load range of said combustor and wherein said combustor further includes a auxiliary burner operable at the start of the operation of said combustor.

5. A combustor including a combustion cylinder having a combustion chamber and premixture supply means provided on one side of said combustion cylinder opposed to said combustion chamber, wherein said premixture supply means includes first premixture supply means disposed along an axis of said combustion cylinder and operating at a high-load range of said combustor, and second premixture supply means provided adjacent to an outer periphery of said first premixture supply means an operated during an entire load range of said combustor; and an auxiliary burner adjacent to an outer periphery of said second premixture supply means and ignited and burned at the start of the operation of said combustor.

6. A combustor including a combustion cylinder having a combustion chamber and premixture supply means provided on one side of said combustion cylinder opposed relation to said combustion chamber, wherein said premixture supply means includes first premixture supply means disposed at a radially-central portion of said combustion cylinder and operating at a high-load range of said combustor, second premixture supply means provided adjacent to an outer periphery of said first premixture supply means and operated at an entire load range of said combustor, and third premixture supply means provided adjacent to an outer periphery of said second premixture supply means and operated at a low-load range of said combustor.

7. A combustor comprising a combustion cylinder having a combustion chamber and premixture supply means provided on one side of said combustion cylinder opposed to said combustion chamber;

wherein said premixture supply means comprises first premixture supply means disposed at a radially-central portion of said combustion cylinder and operated at a high-load range of said combustor, and second premixture supply means provided adjacent to an outer periphery of said first premixture supply means and operable over an entire load range of said combustor; and an auxiliary burner near said second premixture supply means to ignite said second premixture supply means.

8. A combustor comprising a combustion cylinder having a combustion chamber and premixture supply means provided on one side of said combustion cylinder to supply a combustible mixture to said combustion chamber to generate a premix combustion, wherein said premixture supply means includes at least an inner and two outer premixture supply means, said outer premixture supply means being operable when said combustor is operated at a low load, and said inner and outer premixture supply means being operated above a predetermined load level of said combustor.

9. A combustor comprising:

a combustion cylinder having a combustion chamber therein;

first premixture supply means provided on one side of said combustion cylinder and disposed along an axis of said combustion cylinder to supply a combustible mixture to said combustion chamber, said first premixture supply means including a burner;

a second premixture supply means provided adjacent to an outer periphery of said first premixture supply means and supplying a combustible mixture to said combustion chamber, said second premixture supply means including a burner; and a burner provided near said second premixture supply means and adapted to ignite the combustible mixture fed from said second premixture supply wherein the supply of the combustible mixture from said first and second premixture supply means is controlled so that said burner of said second premixture supply means bears all the load of said combustor at a low-load range of said combustor, and said burners of said first and second premixture supply means bears all the load of said combustor at high load range of the combustor.

* * * * *